(12) United States Patent
Liu

(10) Patent No.: US 11,216,627 B2
(45) Date of Patent: Jan. 4, 2022

(54) METHOD AND DEVICE FOR PROVIDING AND VERIFYING TWO-DIMENSIONAL CODE

(71) Applicant: Advanced New Technologies Co., Ltd., Grand Cayman (KY)

(72) Inventor: Jinxing Liu, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 17/162,947

(22) Filed: Jan. 29, 2021

(65) Prior Publication Data

US 2021/0150169 A1 May 20, 2021

Related U.S. Application Data

(63) Continuation of application No. PCT/CN2019/110841, filed on Oct. 12, 2019.

(30) Foreign Application Priority Data

Nov. 28, 2018 (CN) .......................... 201811433719.9

(51) Int. Cl.
*G06K 7/14* (2006.01)
*G06Q 20/40* (2012.01)

(52) U.S. Cl.
CPC .......... *G06K 7/1417* (2013.01); *G06K 7/1443* (2013.01); *G06Q 20/4014* (2013.01)

(58) Field of Classification Search
CPC ........................... G06K 7/1417; G06K 7/1443
USPC .................................................. 235/382, 494
See application file for complete search history.

(56) References Cited

U.S. PATENT DOCUMENTS

| | | | |
|---|---|---|---|
| 2010/0057586 A1* | 3/2010 | Chow ................ | G06Q 30/0601 705/26.1 |
| 2013/0026241 A1* | 1/2013 | Sakahashi ........ | G06K 19/06037 235/494 |
| 2016/0078335 A1* | 3/2016 | Annamalai ...... | G06K 19/06103 382/284 |
| 2017/0076127 A1* | 3/2017 | Arce ................ | G06K 19/06056 |
| 2019/0295056 A1* | 9/2019 | Wright ................ | H04L 51/046 |
| 2020/0334660 A1* | 10/2020 | Mossoba ............... | G06F 40/284 |

* cited by examiner

*Primary Examiner* — Allyson N Trail

(74) *Attorney, Agent, or Firm* — Shun Yao; Park, Vaughan, Fleming & Dowler LLP

(57) ABSTRACT

The present application provides a method and system for providing and verifying a two-dimensional code. During operation, the system receives, from a terminal of a first user, a two-dimensional code generation request comprising service data, which comprises at least an identifier of the first user. The system obtains a picture that is identifiable by naked eyes, associates the obtained picture with the identifier of the first user, and stores the association between the obtained picture and the identifier of the first user. The system generates a two-dimensional code based on the service data or based on a combination of the service data and the obtained picture and provides the two-dimensional code and the obtained picture to the first user, thereby facilitating the first user to display the two-dimensional code and the obtained picture when providing services.

28 Claims, 11 Drawing Sheets

METHOD AND DEVICE FOR PROVIDING AND VERIFYING TWO-DIMENSIONAL CODE

RELATED APPLICATION

Under 35 U.S.C. § 120 and § 365(c), this application is a continuation of PCT Application No. PCT/CN2019/110841, entitled "METHOD AND DEVICE FOR PROVIDING AND VERIFYING TWO-DIMENSIONAL CODE," by inventor Jinxing Liu, filed 12 Oct. 2019, which claims priority to Chinese Patent Application No. 201811433719.9, filed on 28 Nov. 2018.

TECHNICAL FIELD

The present application relates to the field of two-dimensional code technology, in particular to a method and device for providing and verifying a two-dimensional code.

BACKGROUND

Two-dimensional code is also known as two-dimensional barcode. A common two-dimensional code is Quick Response Code (QR code). It is a very popular encoding method on mobile devices in recent years. Compared with the traditional barcode, it can store more information and represent more data types.

With the continuous promotion of off-line payment, the use of two-dimensional code as a payment-receiving code and an entrance for attracting traffic has been widely popular. For example, a merchant may print a two-dimensional payment-receiving code and post it on a cash register for the user to scan the code for payment. For another example, when a platform promotes itself, it may post the download two-dimensional code of its APP at places with more people passing, so as to attract the passing crowd to download the APP by scanning the two-dimensional code.

Now there is such a risk that the two-dimensional codes posted by merchants may be replaced by two-dimensional codes of others. When the two-dimensional codes of merchants are replaced, it is difficult for the merchants to find out that their two-dimensional codes have been replaced because it is difficult to identify the two-dimensional codes. Although each two-dimensional code includes a distinctive logo region, it is still difficult for a merchant to find out whether the two-dimensional code has been replaced because others can customize the logo region of their own two-dimensional codes as the logo of the merchant. In the case that the two-dimensional code of the merchant is replaced, when a user pays, money involved in the transaction will enter the account of others rather than the account of the merchant, which brings a financial loss to the user or the merchant.

Therefore, a more effective solution for providing and verifying a two-dimensional code is needed.

SUMMARY

The purpose of the present application is to provide a more effective solution for providing and verifying a two-dimensional code, so as to avoid the defects in current technologies.

In order to achieve the above purpose, one aspect of the present application provides a method and system for providing and verifying a two-dimension code. During operation, the system receives, from a terminal of a first user, a two-dimensional code generation request comprising service data, which comprises at least an identifier of the first user. The system obtains a picture that is identifiable by naked eyes, associates the obtained picture with the identifier of the first user, and stores the association between the obtained picture and the identifier of the first user. The system generates a two-dimensional code based on the service data or based on a combination of the service data and the obtained picture and provides the two-dimensional code and the obtained picture to the first user, thereby facilitating the first user to display the two-dimensional code and the obtained picture when providing services.

In a variation on this embodiment, providing the two-dimensional code and the obtained picture to the first user comprises: generating a service code by superposing the obtained picture and the two-dimensional code and providing the service code to the first user.

In a further variation, the obtained picture is a picture readable by a two-dimensional code identification apparatus.

In a further variation, the obtained picture is located inside the two-dimensional code.

In a further variation, an area occupied by the obtained picture in the two-dimensional code is determined based on an error correction level of the two-dimensional code.

In a variation on this embodiment, the obtained picture comprises one or more of: a pattern, a character, a number, and a symbol.

In a variation on this embodiment, a possibility of the obtained picture being associated with an identifier of a different user is lower than a predetermined value.

In a further variation, the obtained picture is uniquely associated with the identifier of the first user.

In a further variation, the obtained picture belongs to a picture library comprising a number of pictures greater than a predetermined value.

In a further variation, subsequent to associating the obtained picture with the identifier of the first user, the system marks the picture in the picture library to prevent the picture from being associated with an identifier of a different user.

In a further variation, obtaining the picture comprises randomly selecting a picture from the picture library.

In a variation on this embodiment, a data size associated with the obtained picture is less than or equal to a predetermined value.

In a variation on this embodiment, generating the two-dimensional code based on the combination of the service data and the obtained picture comprises: encrypting the combination of the service data and the obtained picture to obtain encrypted data, and generating the two-dimensional code based on the encrypted data.

In a variation on this embodiment, the system receives, from a terminal of a second user, two-dimensional code information and a picture, wherein the two-dimensional code information and the picture are obtained by the terminal of the second user scanning a service code. The system determines a user identifier and a picture based on the received two-dimensional code information, comparing the determined picture and the received picture, and outputting a verification result of the service code based on an outcome of the comparison.

In a further variation, comparing the determined picture and the received picture comprises determining a similarity between the determined picture and the received picture, and outputting the verification result comprises: in response to the similarity being lower than a predetermined threshold, outputting a result indicating that the verification fails.

In a further variation, outputting the verification result further comprises: in response to the similarity being greater than a predetermined threshold, identifying, based on previously stored associations between user identifiers and pictures, a picture corresponding to the determined user identifier; and in response to the identified picture does not match the received picture, outputting a result indicating that the verification fails.

In a further variation, in response to the identified picture matches the received picture, the system transmits service data associated with the determined user identifier to the second user.

In a further variation, determining the user identifier and the picture comprises decrypting content data associated with the two-dimensional code information.

In a further variation, determining the picture comprises identifying, based on previously stored associations between user identifiers and pictures, a picture corresponding to the determined user identifier, and wherein comparing the determined picture and the received picture comprises determining whether the identified picture matches the received picture.

In order to achieve the above purpose, one aspect of the present application provides a method for providing a two-dimensional code, which includes:

receiving a two-dimensional code generation request from a terminal of a first user, the request including service data corresponding to the two-dimensional code, the service data including a user identifier of the first user;

acquiring a first picture to correspond to the user identifier, the first picture being a picture identifiable by naked eyes;

storing an association relationship between the user identifier and the first picture;

generating a two-dimensional code based on the service data; and providing the two-dimensional code and the first picture to the first user.

Another aspect of the present application provides a method for providing a two-dimensional code, which includes:

receiving a two-dimensional code generation request from a terminal of a first user, the request including service data corresponding to the two-dimensional code, the service data including a user identifier of the first user;

acquiring a first picture to correspond to the user identifier, the first picture being a picture identifiable by naked eyes;

storing an association relationship between the user identifier and the first picture;

generating a two-dimensional code based on the first picture and the service data; and providing the two-dimensional code and the first picture to the first user.

In one embodiment, providing the two-dimensional code and the first picture to the first user includes obtaining a service code by superposing the first picture and the two-dimensional code, and providing the service code to the first user.

In one embodiment, the first picture is a picture readable by a two-dimensional code identification apparatus.

In one embodiment, the first picture is located inside the two-dimensional code.

In one embodiment, the area of the first picture is determined based on an error correction level of the two-dimensional code.

In one embodiment, the first picture includes at least one of the following content: a pattern, a character, a number, and a symbol.

In one embodiment, the rate of repeated acquisition of the first picture for corresponding to other user IDs is lower than a first predetermined value.

In one embodiment, the user identifier uniquely corresponds to the first picture.

In one embodiment, acquiring the first picture corresponding to the user identifier includes acquiring the first picture corresponding to the user identifier from a pre-established picture library, and the picture library includes pictures with a quantity more than a predetermined value.

In one embodiment, the method further includes, after acquiring the first picture corresponding to the user identifier from the pre-established picture library, marking the first picture in the picture library.

In one embodiment, acquiring the first picture corresponding to the user identifier from the pre-established picture library includes randomly acquiring a first picture corresponding to the user identifier from the pre-established picture library.

In one embodiment, the image data size of the first picture is less than or equal to a second predetermined value.

In one embodiment, generating the two-dimensional code based on the first picture and the service data includes encrypting a combination of the first picture and the service data by means of a predetermined encryption mode to acquire encrypted data, and generating a two-dimensional code based on the encrypted data.

Another aspect of the present application provides a method for verifying a two-dimensional code, which includes:

receiving two-dimensional code information and a first picture from a terminal of a second user;

acquiring content data of a two-dimensional code based on the two-dimensional code information;

acquiring service data based on the content data of the two-dimensional code, the service data including a user identifier of a third user;

acquiring a third picture corresponding to the user identifier of the third user based on a pre-stored association relationship between user IDs and pictures;

determining whether the first picture is consistent with the third picture; and in situations where the first picture is not consistent with the third picture, determining that the verification does not pass.

Another aspect of the present application provides a method for verifying a two-dimensional code, which includes:

receiving two-dimensional code information and a first picture from a terminal of a second user;

acquiring content data of the two-dimensional code based on the two-dimensional code information;

acquiring service data and second picture information based on the content data of the two-dimensional code;

determining a similarity between the first picture and the second picture based on information of the first picture and the second picture; and determining that the verification does not pass if the similarity is lower than a predetermined threshold.

In one embodiment, acquiring the service data and the second picture information based on the content data of the two-dimensional code includes decrypting the content data of the two-dimensional code using a predetermined decryption method to obtain service data and a second picture.

In one embodiment, receiving the two-dimensional code information and the first picture from the terminal of the second user includes receiving a service code from the terminal of the second user, wherein the service code includes a two-dimensional code and the first picture that are superposed.

In one embodiment, the two-dimensional code information includes content data of the two-dimensional code.

In one embodiment, the service data include a user identifier of a third user, and the method further includes:

In situations where the similarity between the first picture and the second picture is higher than a predetermined threshold, acquiring a third picture corresponding to the user identifier of the third user based on a pre-stored association relationship between user IDs and pictures;

determining whether the first picture is consistent with the third picture; and in situations where the first picture is not consistent with the third picture, determining that the verification does not pass.

In one embodiment, the method further includes:

In situations where the first picture is consistent with the third picture, determining that the verification passes; and transmitting the service data to the terminal of the second user.

Another aspect of the present application provides a device for providing a two-dimensional code, which includes:

a receiving unit configured to receive a two-dimensional code generation request from a terminal of a first user, the request including service data corresponding to the two-dimensional code, the service data including a user identifier of the first user;

an acquisition unit configured to acquire a first picture to correspond to the user identifier, the first picture being a picture identifiable by naked eyes;

a storage unit configured to store an association relationship between the user identifier and the first picture;

a generation unit configured to generate a two-dimensional code based on the service data; and a providing unit configured to provide the two-dimensional code and the first picture to the first user.

Another aspect of the present application provides a device for providing a two-dimensional code, which includes:

a receiving unit configured to receive a two-dimensional code generation request from a terminal of a first user, the request including service data corresponding to the two-dimensional code, the service data including a user identifier of the first user;

an acquisition unit configured to acquire a first picture to correspond to the user identifier, the first picture being a picture identifiable by naked eyes;

a storage unit configured to store an association relationship between the user identifier and the first picture;

a generation unit configured to generate a two-dimensional code based on the first picture and the service data; and a providing unit configured to provide the two-dimensional code and the first picture to the first user.

In one embodiment, the providing unit further includes a superposition subunit configured to obtain a service code by superposing the first picture and the two-dimensional code, and a providing subunit configured to provide the service code to the terminal of the first user.

In one embodiment, the acquisition unit is further configured to acquire the first picture corresponding to the user identifier from a pre-established picture library, and the picture library includes pictures with a quantity more than a predetermined value.

In one embodiment, the device further includes a marking unit configured to, after acquiring the first picture corresponding to the user identifier from the pre-established picture library, mark the first picture in the picture library.

In one embodiment, the acquisition unit is further configured to randomly acquire a first picture corresponding to the user identifier from the pre-established picture library.

In one embodiment, the generation unit includes an encryption subunit configured to encrypt a combination of the first picture and the service data through a predetermined encryption method to obtain encrypted data, and a generation subunit configured to generate a two-dimensional code based on the encrypted data.

Another aspect of the present application provides a device for verifying a two-dimensional code, which includes:

a receiving unit configured to receive two-dimensional code information and a first picture from a terminal of a second user;

a first acquisition unit configured to acquire content data of the two-dimensional code based on the two-dimensional code information;

a second acquisition unit configured to acquire service data based on the content data of the two-dimensional code, the service data including a user identifier of a third user;

a third acquisition unit configured to acquire a third picture corresponding to the user identifier of the third user based on a pre-stored association relationship between user IDs and pictures;

a first determination unit configured to determine whether the first picture is consistent with the third picture; and a second determination unit configured to determine that the verification does not pass in situations where the first picture is not consistent with the third picture.

In one embodiment, the device further includes:

a third determination unit configured to determine that the verification passes in situations where the first picture is consistent with the third picture; and a transmission unit configured to transmit the service data to the terminal of the second user.

Another aspect of the present application provides a device for verifying a two-dimensional code, which includes:

a receiving unit configured to receive two-dimensional code information and a first picture from a terminal of a second user;

a first acquisition unit configured to acquire content data of the two-dimensional code based on the two-dimensional code information;

a second acquisition unit configured to acquire service data and second picture information based on the content data of the two-dimensional code;

a first determination unit configured to determine a similarity between the first picture and the second picture based on information of the first picture and the second picture; and a second determination unit configured to determine that the verification does not pass if the similarity is lower than a predetermined threshold.

In one embodiment, the second acquisition unit is further configured to acquire service data and the second picture by decrypting the content data of the two-dimensional code using a predetermined decryption method.

In one embodiment, the receiving unit is further configured to receive a service code from the terminal of the second user, and the service code includes a two-dimensional code and the first picture that are superposed.

In one embodiment, the service data include a user identifier of a third user, and the device further includes:

a third acquisition unit configured to acquire a third picture corresponding to the user identifier of the third user based on a pre-stored association relationship between user IDs and pictures in situations where the similarity between the first picture and the second picture is higher than a predetermined threshold;

a third determination unit configured to determine whether the first picture is consistent with the third picture; and a fourth determination unit configured to determine that the verification does not pass in situations where the first picture is not consistent with the third picture.

In one embodiment, the device further includes:

a fifth determination unit configured to determine that the verification passes in situations where the first picture is consistent with the third picture; and a transmission unit configured to transmit the service data to the terminal of the second user.

Another aspect of the present application provides a computer apparatus, which includes a memory and a processor. The computer apparatus is characterized in that executable codes are stored in the memory, and the processor executes the executable codes to implement any one of the methods.

Compared with the traditional two-dimensional code, the two-dimensional code solution according to embodiments of the present application adds a "verification picture," verifying that information carried and displayed in the verification picture and the main body of the two-dimensional code exhibit a basic unique corresponding relationship, and the verification picture is obviously distinguishable, such that when the two-dimensional code is replaced as a whole (main body+verification picture), the user (such as a merchant or a consumer) can easily find out by naked eyes. When the main body of the two-dimensional code is replaced and the verification picture is retained, the whole process will be determined as that the verification does not pass by the server, and the process will be interrupted, thus avoiding the financial loss or other risks.

BRIEF DESCRIPTION OF THE DRAWINGS

By describing the embodiments of the present application with reference to the drawings, the embodiments of the present application will be made clearer.

DETAILED DESCRIPTION OF THE EMBODIMENTS

The embodiments of the present application will be described below with reference to the drawings.

Figure 1:
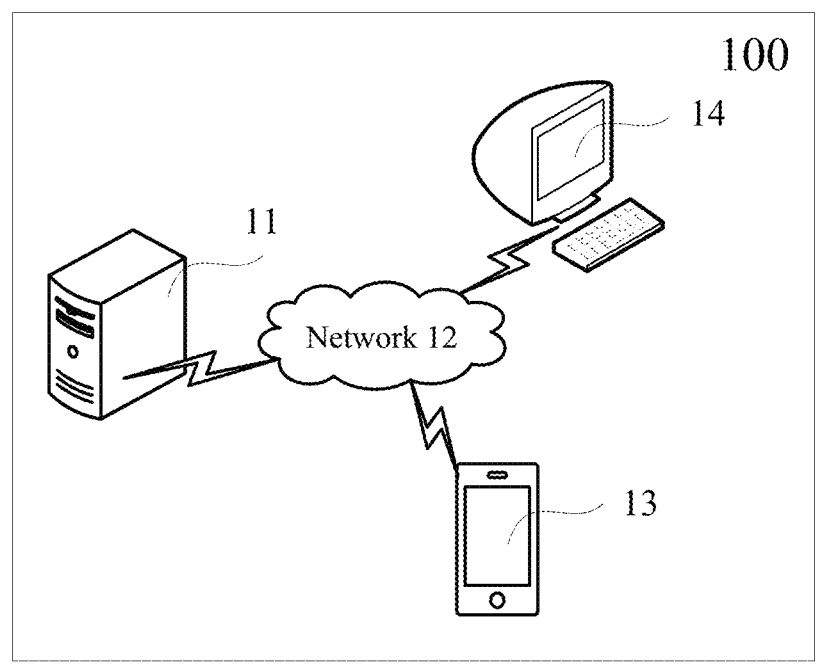
FIG. 1 illustrates a schematic diagram of a service system 100 based on a two-dimensional code according to one embodiment of the present application.

FIG. 1 illustrates a schematic diagram of a service system 100 based on a two-dimensional code according to one embodiment of the present application. Referring to FIG. 1, system 100 may include a server 11, a network 12, a mobile phone 13, a computer 14, etc. System 100 is used, for example, for realizing transaction services between merchants and consumers. Server 11 may be a physical server including a standalone host, or server 11 may be a virtual server hosted by a host cluster; server 11 may host, for example, a service platform of the transaction services. For example, the service platform may be a payment platform. Mobile phone 13, for example, is a terminal used by a consumer, on which there is a client running. For example, the client can realize service functions related to the consumer. Of course, in addition to mobile phone 13, the consumer may also adopt other types of terminal devices such as computers, tablet devices, laptops, PDAs, wearable devices (such as smartglasses and smartwatches), which are not limited by the present application. Computer 14 may a terminal device used by a merchant, and there is a client 2 running on computer 14. The client 2 may realize service functions related to the merchant. Of course, in addition to the computer 14, the merchant may also adopt other types of terminal devices such as mobile phones, tablet devices, laptops, PDAs, wearable devices (such as smartglasses and smartwatches), which are not limited by the present application. Mobile phone 13 and computer 14 interact with server 11 through network 12. Network 12 may include a variety of types of wired or wireless networks. For example, network 12 may include a Public Switched Telephone Network (PSTN) and the Internet.

According to the embodiment of the present application, at the stage of generating a two-dimensional code, computer 14 transmits a request for generating the two-dimensional code to server 11, and the request includes a user identifier of the merchant. Server 11 acquires a first picture corresponding to the user identifier, stores them locally and associatively in the server, and encrypts a combination of the first picture and service data to obtain encrypted data, afterwards, generates a two-dimensional code based on the encrypted data, and superposes the first picture on the two-dimensional code to generate a final service code, and transmits the service code to computer 14. At the stage of verifying the two-dimensional code, for example, the consumer prepares to pay by scanning the two-dimensional code of the merchant. In this case, mobile phone 13 scans the above service code, reads the service code, and transmits it to server 11. Server 11 acquires a two-dimensional code and a first picture based on the service code. Then, server 11 decodes the two-dimensional code to obtain the content data of the two-dimensional code, and decrypts the content data using a predetermined decryption method, so as to acquire service data and a second picture. Server 11 compares the first picture with the second picture, and determines that the verification does not pass in situations where the similarity between the first picture and the second picture is low, so as to terminate the transaction. In situations where the similarity between the first picture and the second picture is higher than a predetermined threshold, server 11 acquires a third picture corresponding to the user identifier based on the user identifier included in the service data, and compares to determine whether the third picture is consistent with the first picture. In situations where the third picture is not consistent with the first picture, it is determined that the verification does not pass, and thus the transaction is terminated. In situations where the third picture is consistent with the first picture, it is determined that the verification passes, and thus the transaction service continues.

System 100 in FIG. 1 and the related description are only schematic. For example, system 100 may include terminals of a plurality of merchants and terminals of a plurality of consumers. In addition, the server is not limited to correspond to a payment platform. For example, it may also correspond to a social platform, a download platform, etc. In a social platform, for example, when users listen to an official account, the system according to the embodiment of the present application can avoid fans interception caused by the replacement of the two-dimensional code. In a download platform, the system according to the embodiment of the present application can avoid download interception caused by the replacement of the two-dimensional code.

Figure 2:
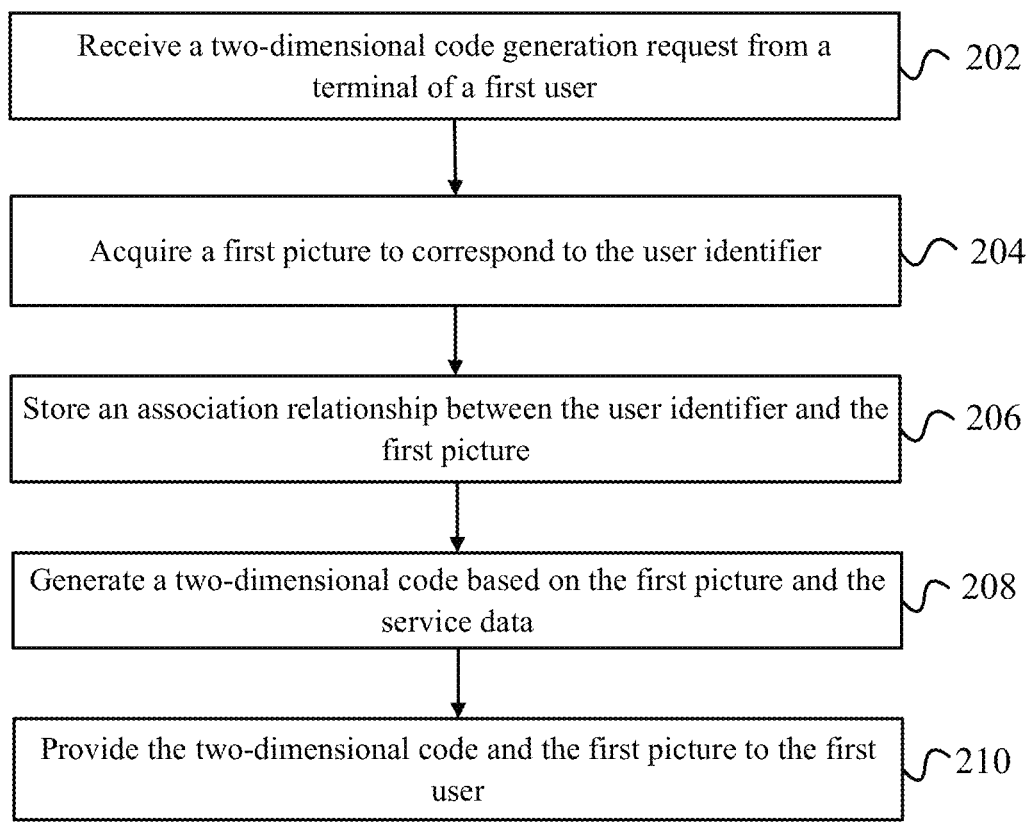
FIG. 2 illustrates a flowchart of a method for providing a two-dimensional code according to one embodiment of the present application.

FIG. 2 illustrates a flowchart of a method for providing a two-dimensional code according to one embodiment of the present application, including:

In step S202, a two-dimensional code generation request is received from a terminal of a first user. The request includes service data corresponding to the two-dimensional code. The service data include a user identifier of the first user.

In step S204, a first picture is acquired to correspond to the user identifier. The first picture is a picture identifiable by naked eyes.

In step S206, an association relationship between the user identifier and the first picture is stored.

In step S208, a two-dimensional code is generated based on the first picture and the service data.

In step S210, the two-dimensional code and the first picture are provided to the first user.

Firstly, in step S202, a two-dimensional code generation request is received from a terminal of a first user. The request includes service data corresponding to the two-dimensional code. The service data include a user identifier of the first user.

As mentioned above, the method is implemented, for example, on the server of a service platform. The payment platform is, for example, a payment platform (such as Alipay platform). The first user is, for example, a merchant, whose terminal may be a computer, a mobile phone, or the like. The merchant wants, for example, to generate a two-dimensional code from an Alipay account to facilitate consumers in making payment. Thus, the merchant transmits a two-dimensional code generation request to the server and includes in the request their own Alipay account. In one embodiment, for example, a merchant wants to generate a two-dimensional code for each piece of merchandise sold by him such that consumers can automatically purchase when selecting merchandise. In this case, the two-dimensional code generation request sent by the merchant to the server may further include service data such as merchandise name and merchandise price in addition to the Alipay account. It can be understood that the service platform is not limited to the payment platform, and the service data included in the two-dimensional code generation request are correspondingly different, depending on different service platforms. For example, in the case of a download platform, the service data may include service data such as name of a to-be-downloaded APP and price of the APP.

In step S204, a first picture is acquired to correspond to the user identifier. The first picture is a picture identifiable by naked eyes.

The first picture must be identifiable by naked eyes. For example, the picture may include a clear pattern, a character, a number, a symbol, and a combination thereof. For example, the pattern may be a heart-shaped pattern, a computer pattern, etc. The character may be in various languages, such as Chinese or English. The number may be an Arabic numeral, a Roman numeral, etc. The symbol includes, for example, a punctuation symbol, an emotion icon, an operation symbol, etc. In addition, the picture can include different colors used for picture identification. By making the first picture identifiable, in the subsequent use of the two-dimensional code, the user of the two-dimensional code can firstly identify the authenticity of the two-dimensional code by naked eyes based on the first picture.

Figure 3:
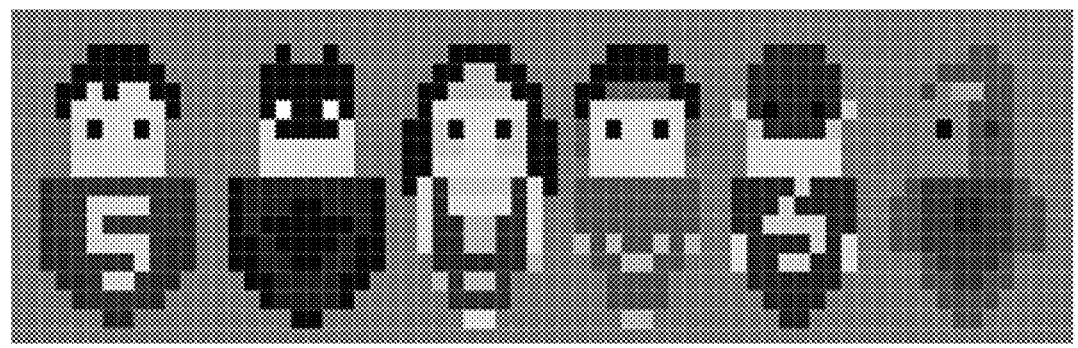
FIG. 3 illustrates a schematic diagram of pictures readable by a two-dimensional code identification apparatus.

In one embodiment, the first picture may be read by a two-dimensional code identification apparatus. The two-dimensional code recognition apparatus is, for example, a mobile phone, a code scanner, etc. In the case of a code scanner, for example, the code scanner scans the two-dimensional code through a photoelectric device therein, thereby converting the two-dimensional code into a binary character string (i.e., 01 string). FIG. 3 illustrates a schematic diagram of pictures readable by a two-dimensional code identification apparatus. Referring to FIG. 3, six patterns illustrated therein are generated based on the format of the two-dimensional code, that is, the edge or interior of each pattern consists of a plurality of blocks, and the size of each block is the same as that of a bit in the two-dimensional code pattern, such that the code scanner can identity them together with the two-dimensional code as a binary character string when scanning the picture. In one embodiment, the identification apparatus may include a color identification device such that the colored first picture can be identified as a binary character string with color information. It can be understood that the first picture does not have to be read by a two-dimensional code identification apparatus. For example, after the first picture is scanned by a mobile phone, the first picture may be identified by an image identification apparatus, device, unit, etc.

In one embodiment, the first picture is placed inside the two-dimensional code (for example, at the center) in subsequent steps. In this case, the area of the first picture is determined based on an error correction level of the two-dimensional code. For example, the higher the error correction level of the two-dimensional code, the larger the area of the first picture. Thus, when the first picture is disposed at the center of the two-dimensional code, the complete data of the two-dimensional code can still be identified through an error correction code.

In one embodiment, the user identifier uniquely corresponds to the first picture. For example, if a merchant has branches in a plurality of cities in the country, the payment two-dimensional code of the merchant will be used in the plurality of cities. By making the user identifier uniquely corresponding to the first picture, the security of the two-dimensional code in any city can be ensured. In one embodiment, the first picture uniquely corresponds to the user identifier in the region of use of the two-dimensional code. For example, the merchant only operates in one city (such as Beijing), that is, its two-dimensional code is only used in Beijing, and within the range of Beijing, the user identifier of the merchant uniquely corresponds to the first picture. At other places, for example, in Hangzhou, even if there is another user identifier and the picture corresponding thereto is the same as the first picture, the probability of the other user knowing the first picture corresponding to the merchant in Beijing is the same as the picture corresponding thereto and using his own two-dimensional code to counterfeit the two-dimensional code of the merchant will be very low.

In one embodiment, a picture library may be pre-established, and the picture library includes a sufficiently large number of pictures that can be used for verification. For example, the magnitude of the number of pictures may be hundreds of thousands, millions, etc. When a two-dimensional code needs to be generated and a picture corresponding to a user identifier needs to be acquired, in one embodiment, a first picture may be acquired from the picture library, and during the acquisition of the first picture, the first picture may be marked as unavailable in the picture library, so as to prevent the first picture from being reused. In one embodiment, the first picture may be randomly acquired from the picture library. Due to the large number of pictures in the picture library, the probability of repeated acquisition of a picture is very low, thus ensuring the security of the method.

In the embodiment of the present application, it is not limited to acquire the first picture from the picture library. For example, the first picture may be generated on site based on a predetermined rule, the first picture may be acquired by providing the picture by the first user himself, and so on. In these cases, as long as the rate of repeated acquisition of the first picture with respect to different user IDs is lower than a predetermined threshold, the security of the method can be ensured.

In one embodiment, the image data size of the first picture is smaller than a second predetermined value. According to the subsequent steps of the method, the encrypted data are obtained by encrypting the combination of the first picture and the service data, and the encrypted data are encoded to obtain the two-dimensional code. Therefore, the maximum value of the data size of the first picture may be determined based on the maximum number of bits that can be represented by the two-dimensional code, the encryption method, and the reserved size of the service data, and the image data size of the first picture is limited to be smaller than or equal to the maximum value. In addition, limiting the image data size of the first picture to be smaller than or equal to a predetermined value is also conducive to saving the data transmission cost when the first picture is transmitted. In one embodiment, in the case of the first picture having a large data size, the first picture may be compressed firstly, and then the combination of the compressed first picture and the service data may be encrypted.

In step S206, an association relationship between the user identifier and the first picture is stored. In one embodiment, the user identifier and the first picture are recorded in a database in order to be used for subsequent verification. The user identifier is, for example, a user's email address, and the first picture may be represented by a binary character string and stored in the database in the case that the first picture is, for example, a picture in FIG. 3. In one embodiment, the user identifier and the identifier of the first picture may be recorded in the database. For example, the first picture is a picture with a large data size, and in this case, the pictures in the picture library may be numbered, and only the serial number of the first picture and the corresponding user identifier are recorded in the database. During two-dimensional code verification, the corresponding picture can be acquired from the picture library according to the serial number of the picture.

In step S208, a two-dimensional code is generated based on the first picture and the service data.

In one embodiment, generating the two-dimensional code based on the first picture and the service data includes encrypting a combination of the first picture and the service data using a predetermined encryption method to obtain encrypted data, and generating a two-dimensional code based on the encrypted data.

The first picture may be represented as a 01 character matrix, such that the 01 character string can be acquired based on the character matrix. The service data, for example, is the user identifier of the first user, such as an email address or a mobile phone number of the first user. Therefore, the combination of the first picture and service data may be a combination of numbers, a combination of numbers, letters, and symbols, or the like. The ways of combination is not limited by the present application. For example, the user identifier may be placed in front, or behind, or in the middle of the character string corresponding to the first picture, as long as it can be separated correspondingly during subsequent two-dimensional code verification. The encryption method may be symmetric encryption, asymmetric encryption, etc., which is not limited by the present application. The encrypted data obtained after encryption may also be a combination of numbers, a combination of numbers, letters, and symbols, or the like. Then, based on the encrypted data, the encrypted data are encoded through an encoding rule of a predetermined version of two-dimensional codes, so as to obtain the two-dimensional code. The two-dimensional code is stored in the format of picture.

In the embodiment of the present application, generating a two-dimensional code based on the first picture and the service data is not limited to generating a two-dimensional code based on the encrypted data of the combination thereof. For example, a two-dimensional code may be generated directly based on the combination, a two-dimensional code may be generated based on the combination of the encrypted data of the first picture and the service data, a two-dimensional code may be generated based on the combination of a hash value of the first picture and the service data, etc.

In step S210, the two-dimensional code and the first picture are provided to the first user.

Figure 4:
FIG. 4 illustrates a schematic diagram when a first picture is disposed at a center of a two-dimensional code.

In one embodiment, after the two-dimensional code is generated, the two-dimensional code and the first picture are transmitted to the terminal of the first user. In one embodiment, after the two-dimensional code is acquired, the first picture and the two-dimensional code picture are superposed together to acquire a service code, so as to transmit the service code to the terminal of the first user to simultaneously transmit the first picture and the two-dimensional code. In one embodiment, the first picture is disposed inside the two-dimensional code. For example, the first picture is disposed at the center of the two-dimensional code picture, i.e., at a position similar to the position of the logo region of the traditional two-dimensional code. FIG. 4 illustrates a schematic diagram when the first picture is disposed at the center of the two-dimensional code picture. Referring to FIG. 4, it illustrates two service codes according to the embodiment of the present application. The patterns at the centers of the two service codes are distinguishable, so it can be identified by naked eyes that the two service codes correspond to different user IDs. As shown in the drawing, the center position of the service code is the position of the first picture, which is a verification region according to the embodiment of the present application, and a data region surrounds the verification region of the service code. In this case, as mentioned above, the area of the first picture needs to be determined based on an error correction level of the two-dimensional code. The first picture is not limited to be disposed inside the two-dimensional code picture. For example, the first picture may be disposed outside the two-dimensional code picture. For example, it may be disposed outside one side of the two-dimensional code picture, or may be disposed outside the four sides of the two-dimensional code picture, which is not limited by the present application. In situations where the first picture is disposed outside the two-dimensional code picture, the size of the first picture is not limited. Generally, the size of the first picture may be set to a size capable of facilitating the two-dimensional code scanning apparatus to scan the first picture and the two-dimensional code simultaneously in one scan.

It can be understood that the first picture and the two-dimensional code picture are not limited to one transmission, and the first picture and the two-dimensional code picture may be respectively transmitted to the terminal of the first user in two transmissions. For example, the first picture may be transmitted firstly, and then the two-dimensional code picture is transmitted, etc. In addition, the embodiment of the present application is not limited to transmitting the first picture and the two-dimensional code picture to the terminal of the first user by the server. For example, the terminal of the first user may read the two-dimensional code picture and the first picture from the server.

After receiving the two-dimensional code and the first picture from the server, the first user may print the two-dimensional code and post it to facilitate other users to scan the code.

Figure 5:
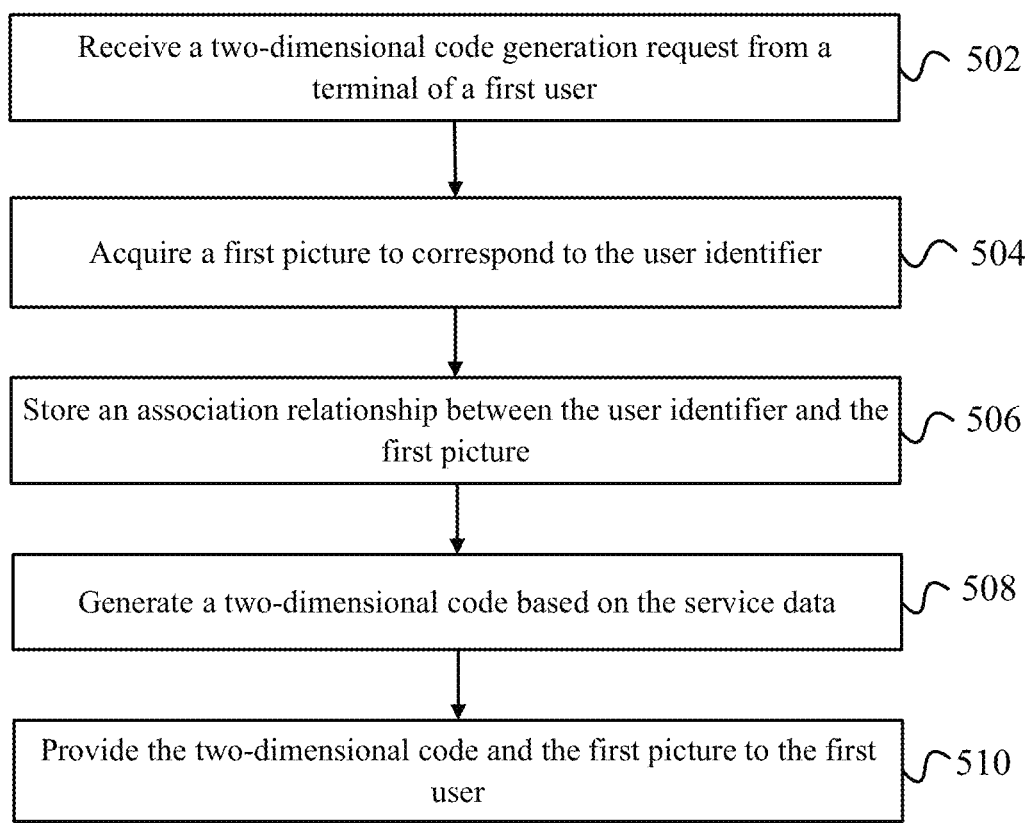
FIG. 5 illustrates a flowchart of a method for providing a two-dimensional code according to one embodiment of the present application.

FIG. 5 illustrates a flowchart of a method for providing a two-dimensional code according to one embodiment of the present application, including:

In step S502, a two-dimensional code generation request is received from a terminal of a first user. The request includes service data corresponding to the two-dimensional code. The service data include a user identifier of the first user.

In step S504, a first picture is acquired to correspond to the user identifier. The first picture is a picture identifiable by naked eyes.

In step S506, an association relationship between the user identifier and the first picture is stored.

In step S508, a two-dimensional code is generated based on the service data.

In step S510, the two-dimensional code and the first picture are provided to the first user.

For steps S502-S506 and S510, a reference may be made to the specific description of steps S202-S206 and S210, which will not be repetitively described here. The difference of the method shown in FIG. 5 from the method shown in FIG. 2 lies in that, in step S508, a two-dimensional code is generated based on the service data. For example, the service data are the user identifier of the first user. In this step, a two-dimensional code may be generated based on the user identifier, or a two-dimensional code may be generated based on the encrypted data of the user identifier, etc. Similarly, the service data are not limited to only including the user identifier, but may include other service data such as merchandise cost. In this case, the image data size of the first picture is no longer limited.

Figure 6:
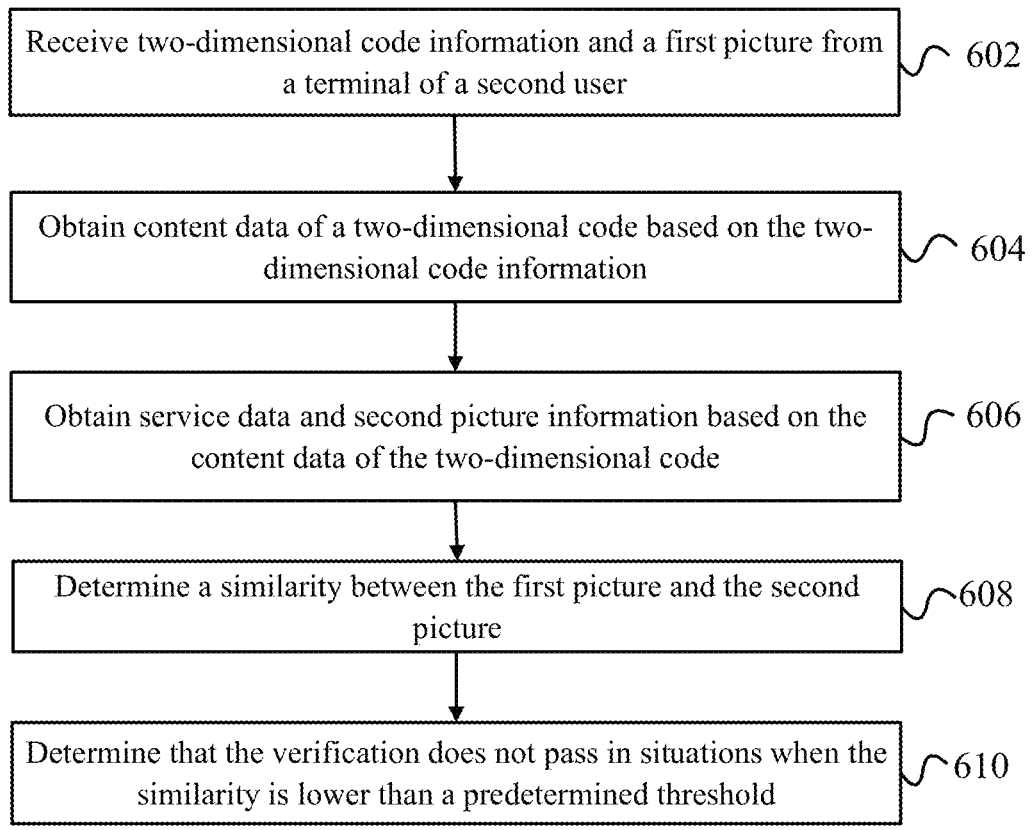
FIG. 6 illustrates a flowchart of a method for verifying a two-dimensional code according to one embodiment of the present application.

FIG. 6 illustrates a flowchart of a method for verifying a two-dimensional code according to one embodiment of the present application, including:

In step S602, two-dimensional code information and a first picture are received from a terminal of a second user.

In step S604, content data of a two-dimensional code are obtained based on the two-dimensional code information.

In step S606, service data and second picture information are obtained based on the content data of the two-dimensional code.

In step S608, a similarity between the first picture and the second picture is determined based on information of the first picture and the second picture.

In step S610, it is determined that the verification does not pass if the similarity is lower than a predetermined threshold.

Firstly, in step S602, two-dimensional code information and a first picture are received from a terminal of a second user. The method is implemented in a server of a service platform (e.g., a payment platform). The second user is, for example, a consumer, who is about to perform a payment service through the payment platform by scanning the merchant's service code with his own two-dimensional code identification apparatus (such as a mobile phone). The second user may observe the first picture before scanning the code to determine whether the first picture is a verification picture pre-published by the merchant. Since the first picture is a picture identifiable by naked eyes, the second user can easily make the determination. For example, the first picture is superposed on the center of the two-dimensional code, and the second user determines whether the first picture is the verification picture of the merchant by observing the first picture at the center of the two-dimensional code. In other words, the second user scans the service code after determining that the first picture is the verification picture of the merchant. On the other hand, the merchant may also check with naked eyes whether the picture in the service code is the verification picture to determine whether the service code is replaced by others.

In one embodiment, as described above, in the case that the two-dimensional code and the first picture are superposed to form a service code, the second user reads the service code as a binary data string by scanning the service code, and transmits the binary data string to the server. According to a preset position, data at the predetermined position in the binary data string is the data corresponding to the first picture, and data at other positions are the data corresponding to the two-dimensional code.

In one embodiment, the two-dimensional code identification apparatus of the user is equipped with hardware or software for decoding the two-dimensional code. Thus, after reading the service code as a binary data string, the user can not only obtain the data corresponding to the first picture as described above, but also decode the data corresponding to the two-dimensional code through the decoding device, so as to obtain the content data corresponding to the two-dimensional code.

In addition, as described above, the two-dimensional code information and the first picture are not limited to be transmitted at one time by an apparatus of the second user. In the case that the two-dimensional code information and the first picture are superposed to form a service code, the apparatus of the second user may firstly transmit the first picture (corresponding data string) to the server after reading the binary character string and obtaining the data string corresponding to the first picture, and then after decoding the two-dimensional code, transmit the content information of the two-dimensional code to the server. In the case that the two-dimensional code and the first picture are not superposed together, the apparatus of the second user may separately, in two times, scan the two-dimensional code and the first picture, and the two-dimensional code information and the first picture may be transmitted to the server successively after each scanning.

In step S604, content data of a two-dimensional code are obtained based on the two-dimensional code information.

As described above, in one embodiment, the apparatus of the second user scans the service code, reads the binary character string corresponding to the service code, and transmits the character string to the server. In this case, the two-dimensional code information is a character string corresponding to the part of the two-dimensional code in the character string. The server decodes the two-dimensional code based on an error correction code in the two-dimensional code to obtain the complete content data of the two-dimensional code.

In one embodiment, the apparatus of the second user includes a decoding device, decodes the scanned two-dimensional code to obtain the content data of the two-dimensional code, and transmits the content data of the two-dimensional code to the server, that is, the two-dimensional code information includes the content data of the two-dimensional code. Thus, the server may obtain the content data of the two-dimensional code directly from the received two-dimensional code information without further decoding.

In step S606, service data and second picture information are obtained based on the content data of the two-dimensional code.

In one embodiment, obtaining the service data and the second picture information based on the content data of the two-dimensional code includes decrypting the content data of the two-dimensional code using a predetermined decryption method to obtain service data and a second picture.

As described above with reference to FIG. 2, the server generates a two-dimensional code based on the encrypted data when generating the two-dimensional code, and the encrypted data are obtained by encrypting a combination of the service data and the second picture. Therefore, after the content data of the two-dimensional code information are obtained, the content data may be decrypted accordingly. For example, in the case of performing encryption by adopting a symmetric encryption method, the content data may be decrypted using the same key as the encryption. In the case of performing encryption by adopting an asymmetric encryption method, the content data may be decrypted using another preset key. After decryption, the decrypted data are split according to the way of combination of the service data and the second picture during encryption, so as to obtain the service data and the second picture. Here, the second picture, i.e., the data representation of the second picture, which is usually a binary character matrix, is obtained from the data string corresponding to the second picture in the decrypted data. For example, in a binary character string arranged in sequence corresponding to the second picture, a plurality of rows of the matrix are obtained by regarding a predetermined number of continuous characters as one row, so as to obtain the binary character matrix corresponding to the second picture. In addition, as described above, the service data are plaintext data. For example, in the scenario of the payment platform, it corresponds to the account of the user (for example, the first user).

It can be understood that, based on the content data of the two-dimensional code, the method for obtaining the service data and the second picture information is not limited to the above decryption method, and the specific method depends on the form of the obtained content data of the two-dimensional code. For example, if the content data of the two-dimensional code are a combination of plaintext service data and the second picture, the service data and the second picture may be directly obtained. For example, if the content data of the two-dimensional code are a combination of the encrypted data of the service data and the second picture, the service data and the second picture may be obtained by decrypting the service data. For example, if the content data of the two-dimensional code are a combination of the service data and the hash value of the second picture, the service data and the hash value of the second picture (i.e., second picture information) may be directly acquired.

In step S608, a similarity between the first picture and the second picture is determined based on information of the first picture and the second picture.

In one embodiment, the second picture information is the second picture itself. In the case that the first picture is the picture shown in FIG. 3, that is, the identification apparatus of the second user can read the first picture while reading the two-dimensional code. In the case that the two-dimensional code is not replaced, the second picture is, for example, a picture obtained by encrypting the combination of the two-dimensional code and the first picture, scanning, decrypting, and then splitting by the apparatus. Therefore, the second picture and the first picture should be basically the same. There may be slight errors when the apparatus scans the code, and after encryption and decryption, slight errors may be caused due to different encryption methods. In this case, the similarity between the first picture and the second picture may be computed by adopting various similarity computation methods based on the data representation (such as matrix) of the first picture and the second picture, and the similarity should be high. The similarity includes Euclidean distance, Minkowski distance, cosine similarity, etc.

In one embodiment, the second picture information is the second picture itself. In the case that the first picture cannot be read directly by the two-dimensional code identification apparatus but identified by an image identification device, and in the case that the two-dimensional code is not replaced, since there are deviations in the clarity, color, brightness, and the like of the picture acquired through image identification, the similarity between the first picture and the second picture (the second picture acquired as described above, for example) should be lower than that in the previous case. In this case, the similarity may be computed in a same way based on the data representation of the first picture and the second picture by adopting various similarity computation methods, or the similarity may be computed based on the picture features and content features of the first picture and the second picture.

In one embodiment, when the content data of the two-dimensional code are a combination of the service data and the hash value of the second picture, that is, the second picture information is the hash value of the second picture, the hash value of the first picture may be obtained by performing the same hash computation on the first picture, and the similarity between the first picture and the second picture may be computed based on the hash value of the first picture and the hash value of the second picture.

In step S610, it is determined that the verification does not pass if the similarity is lower than a predetermined threshold.

The magnitude of the threshold may be set according to different types of pictures. For example, in the case that the first picture is the picture shown in FIG. 3 and in the case that the two-dimensional code is not replaced, the similarity between the first picture and the second picture should be very high. Therefore, the predetermined threshold for this type of pictures may be set as high. For example, the similarity threshold is 90%. When the similarity is lower than 90%, it is determined that the verification does not pass. For example, in the case that the first picture is obtained by image identification through the image identification device, the predetermined threshold may be correspondingly set lower than the threshold in the above case, for example, to 80%.

In the payment scenario, for example, the second user prepares to pay to the first user by scanning the service code. As mentioned above, the first user has confirmed that the first picture in the service code is the verification picture pre-published by the first user. If another person (such as a third user) simply replaces the two-dimensional code part in the service code with his own two-dimensional code, that is, including the user identifier of the third user, after the server obtains the second picture from the two-dimensional code of the third user through steps S602-S606, the second picture and the first picture must be greatly different, that is, the similarity between the first picture and the second picture is lower than the predetermined threshold, such that it can be determined that the verification does not pass to prevent such code counterfeiting behavior. Thus, by simply comparing the first picture with the second picture, such code counterfeiting behavior can be initially stopped, the subsequent step of searching the database is omitted and the time cost is saved.

In the above scenario, after it is determined that the verification does not pass, the payment service can be terminated. In addition, the second user may be informed of that the two-dimensional code has been replaced. In one embodiment, the merchant account corresponding to the first picture may also be obtained through the first picture, and the merchant is informed of that his two-dimensional code has been replaced by others. In one embodiment, an announcement may also be made in the platform to remind other users of similar risks.

In one embodiment, the user identifier of the third user is included in the above service data obtained through decryption. For example, in the payment scenario, the user identifier included in the service data is an account to be used for receiving payment. In the case that the similarity between the first picture and the second picture is higher than a predetermined threshold, a third picture corresponding to the user identifier of the third user is acquired based on a pre-stored association relationship between user IDs and pictures; and in the case that the first picture is not consistent with the third picture, it is determined that the verification does not pass. According to the above description with reference to FIG. 2, when generating each two-dimensional code, the platform server will acquire a picture corresponding to the corresponding user identifier, and store the association relationship in the server, for example, store in a database. Therefore, after the user identifier of the third user is obtained from the service data, a third picture corresponding to the user identifier of the third user may be found in the database.

In a code counterfeiting scenario, the third user has cracked the encryption algorithm, encrypts the combination of his account and the first picture to generate a two-dimensional code and superposes the first picture to generate an illegal service code. In this case, the second user identifies the first picture as the verification image of the first user by naked eyes, and the server also determines that the first picture and the second picture are the same. However, after obtaining the account of the third user, the server searches a third picture corresponding to the third user, and determines that the third picture is not consistent with the first picture, so as to determine that the verification does not pass, stop the code counterfeiting behavior, and terminate the payment service.

In one embodiment, for example, in a scenario that the second user intends to make payment to the first user through the two-dimensional code, in the case that the two-dimensional code is not replaced, the third user is the first user, that is, the third picture and the first picture are the picture corresponding to the first user, so they are consistent. Thus, in the case that the first picture is consistent with the third picture, it can be determined that the verification passes, and the service data are transmitted to the terminal of the second user to continue the payment service.

Figure 7:
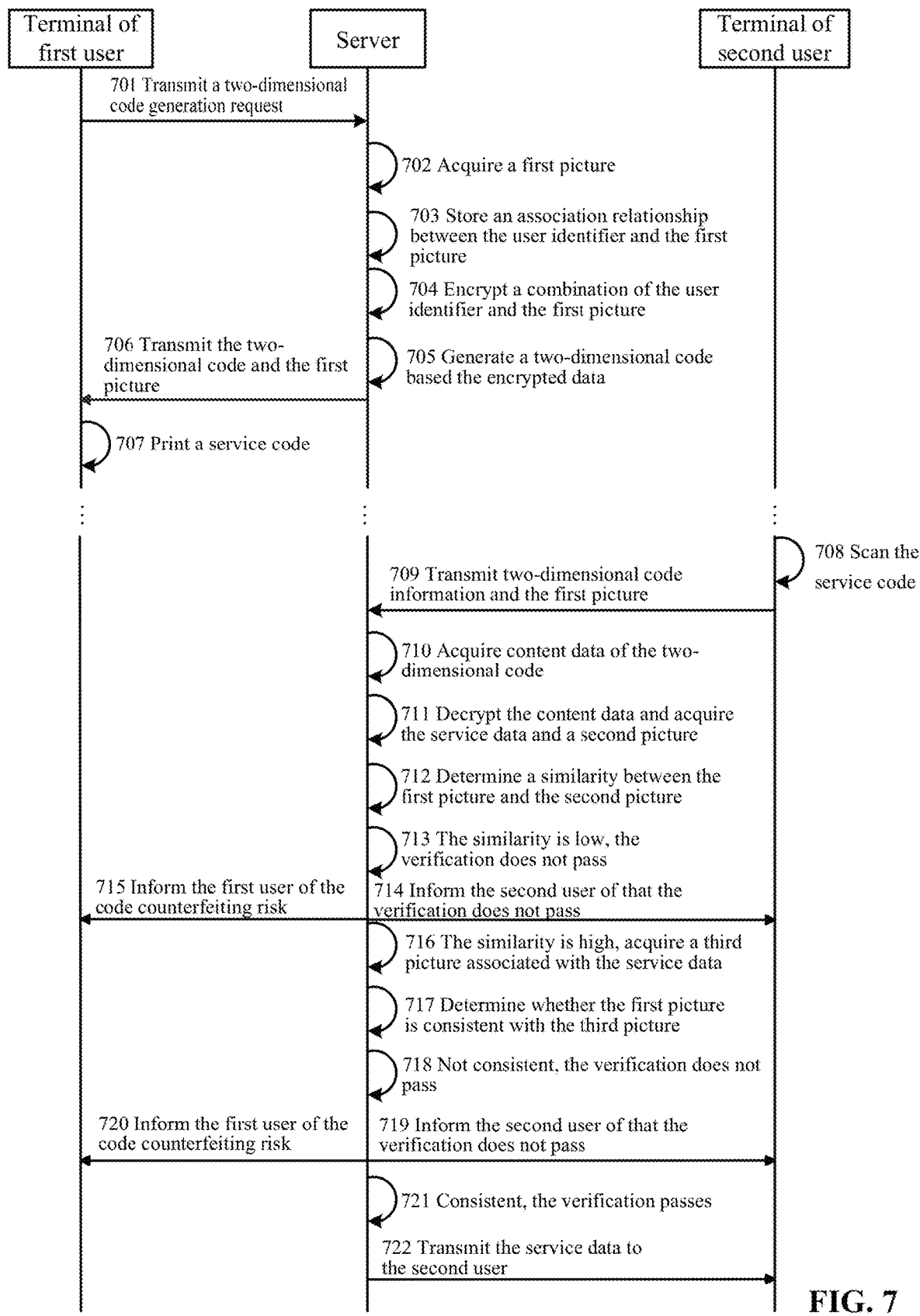
FIG. 7 illustrates a diagram of interaction between a server and a first user terminal and a second user terminal according to one embodiment of the present application.

FIG. 7 illustrates a diagram of interaction between a server and a first user terminal and a second user terminal according to one embodiment of the present application. Referring to FIG. 7, a first stage is a stage of generating a two-dimensional code. Firstly, a terminal of a first user transmits a two-dimensional code generation request to a server in step 701. The request includes service data corresponding to the two-dimensional code. The service data include a user identifier of the first user. After receiving the request, the server acquires a first picture in step 702 to correspond to the user identifier of the first user, and stores an association relationship between the first picture and the user identifier in step 703. Then, in step 704, the server encrypts a combination of the user identifier and the first picture to generate encrypted data, and generates, in step 705, a two-dimensional code based on the encrypted data. After that, the server transmits, in step 706, the two-dimensional code and the first picture to the terminal of the first user for the first user to use. In one embodiment, the server superposes the first picture at the center of the two-dimensional code to form a service code, and transmits the service code to the terminal of the first user. After receiving the service code, the terminal of the first user prints the service code in step 707 and posts the service code, for example, at a cash register for consumers to scan and pay.

Referring to FIG. 7, a second stage is a stage of verifying the two-dimensional code. A second user scans, in step 708, the service code by using his terminal (such as a mobile phone) to obtain the two-dimensional code information and the first picture, and transmits them to the server in step 709. After receiving the two-dimensional code information and the first picture, the server obtains content data of the two-dimensional code in step 710, decrypts the content data in step 711 to obtain the service data and a second picture.

The server determines the similarity between the first picture and the second picture in step 712, and determines that the verification does not pass in step 713 when the similarity is lower than a predetermined threshold. In steps 714-715, after determining that the verification does not pass, the server may inform the terminal of the first user and the terminal of the second user respectively to remind them to be aware of the code counterfeiting risk. In addition, the server may also issue an announcement on the platform to remind other users to be vigilant against the code counterfeiting risk. In step 716, in situations where the similarity is higher than the predetermined threshold, the server acquires a third picture associated with the user identifier included in the service data; and determines, in step 717, whether the first picture is consistent with the third picture; if not consistent, determines that the verification does not pass in step 718, and similarly informs the first user and the second user in steps 719-720; if consistent, determines that the verification passes in step 721; and transmits the service data to the terminal of the second user in step 722 to continue the subsequent service.

Figure 8:
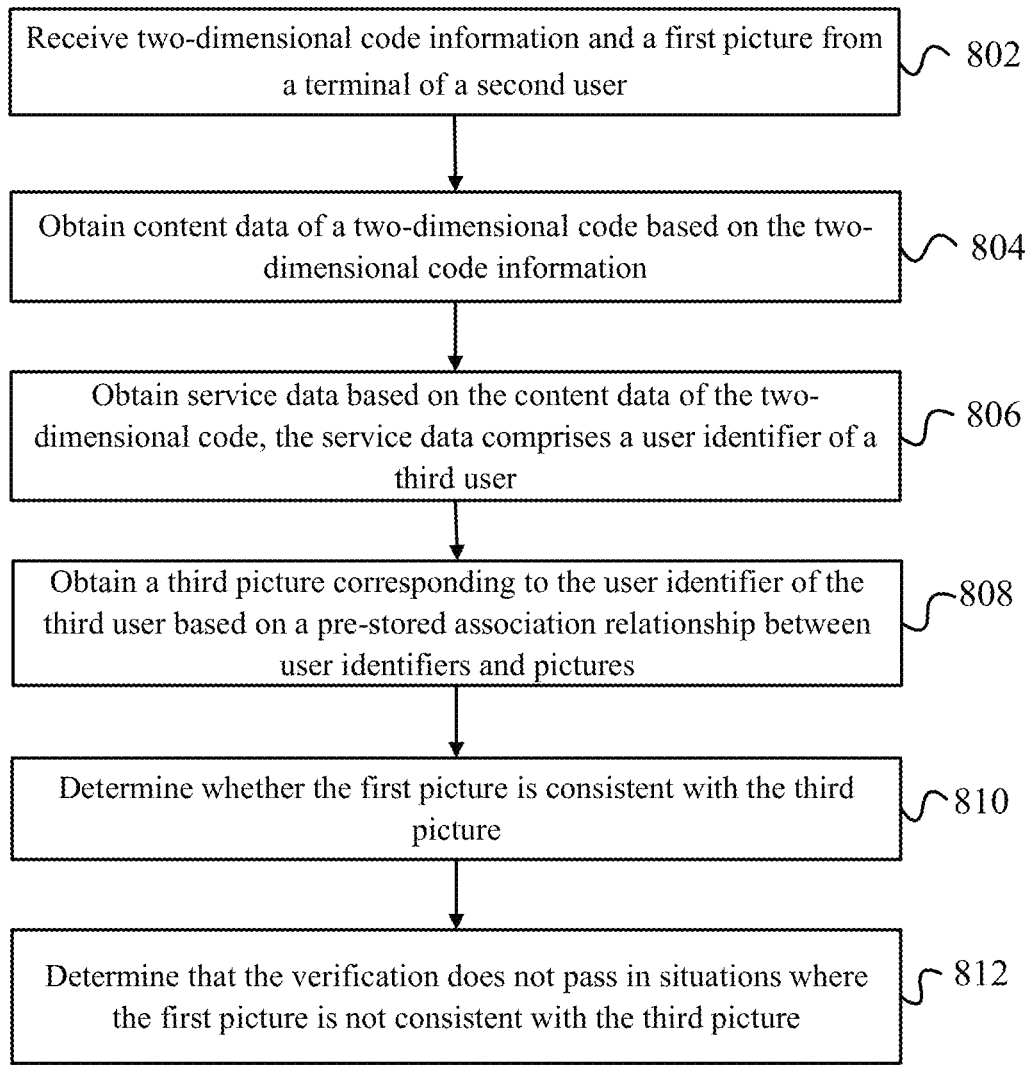
FIG. 8 illustrates a flowchart of a method for verifying a two-dimensional code according to one embodiment of the present application.

FIG. 8 illustrates a method for verifying a two-dimensional code according to one embodiment of the present application, including:

In step S802, two-dimensional code information and a first picture are received from a terminal of a second user.

In step S804, content data of a two-dimensional code are obtained based on the two-dimensional code information.

In step S806, service data are obtained based on the content data of the two-dimensional code. The service data include a user identifier of a third user.

In step S808, a third picture corresponding to the user identifier of the third user is acquired based on a pre-stored association relationship between user IDs and pictures.

In step S810, whether the first picture is consistent with the third picture is determined.

In step S812, in situations where the first picture is not consistent with the third picture, it is determined that the verification does not pass.

For steps S802-S804 and S808-S812, a reference may be made with reference to the specific description of the corresponding steps in FIG. 6, which will not be repetitively described here. In step S806, service data are obtained based on the content data of the two-dimensional code. The service data include a user identifier of a third user. In one embodiment, the content data of the two-dimensional code are plaintext service data, and the service data may be directly obtained. In one embodiment, the content data of the two-dimensional code are encrypted data of the service data, and the encrypted data are decrypted by adopting a predetermined decryption method, so as to obtain the corresponding service data.

The method further includes determining that the verification passes in situations where the first picture is consistent with the third picture; and transmitting the service data to the terminal of the second user.

Figure 9:
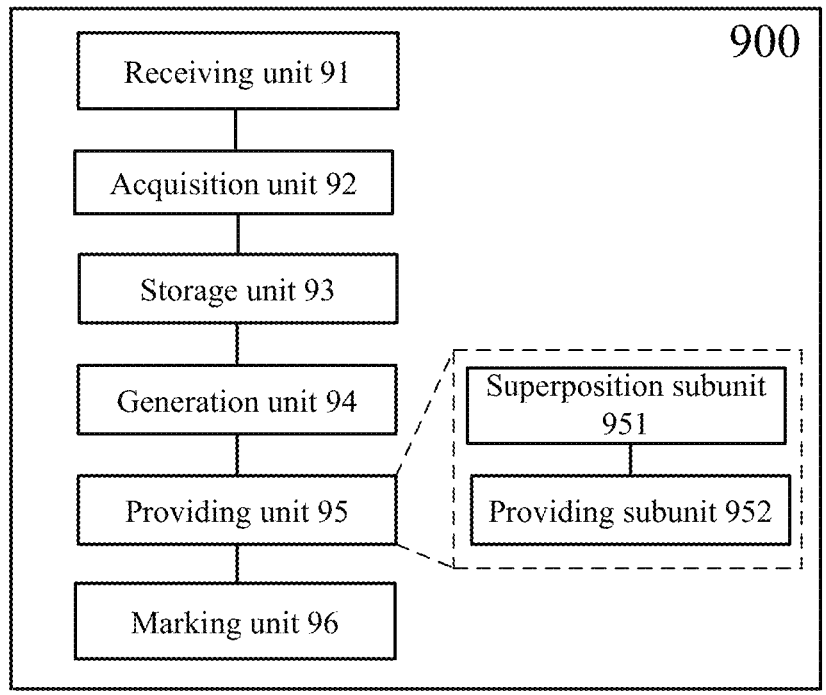
FIG. 9 illustrates a device 900 for providing a two-dimensional code according to one embodiment of the present application.

FIG. 9 illustrates a device 900 for providing a two-dimensional code according to one embodiment of the present application, including:

a receiving unit 91 configured to receive a two-dimensional code generation request from a terminal of a first user, the request including service data corresponding to the two-dimensional code, the service data including a user identifier of the first user;

an acquisition unit 92 configured to acquire a first picture to correspond to the user identifier, the first picture being a picture identifiable by naked eyes;

a storage unit 94 configured to store an association relationship between the user identifier and the first picture;

a generation unit 94 configured to generate a two-dimensional code based on the first picture and the service data; and a providing unit 95 configured to provide the two-dimensional code and the first picture to the first user.

In one embodiment, providing unit 95 further includes a superposition subunit 951 configured to superpose the first picture and the two-dimensional code to obtain a service code, and a providing subunit 952 configured to transmit the service code to the first user.

In one embodiment, acquisition unit 92 is further configured to acquire the first picture corresponding to the user identifier from a pre-established picture library, and the picture library includes pictures with a quantity more than a predetermined value.

In one embodiment, the device further includes a marking unit 96 configured to, after acquiring the first picture corresponding to the user identifier from the pre-established picture library, mark the first picture in the picture library.

In one embodiment, the acquisition unit 92 is further configured to randomly acquire a first picture corresponding to the user identifier from the pre-established picture library.

Figure 10:
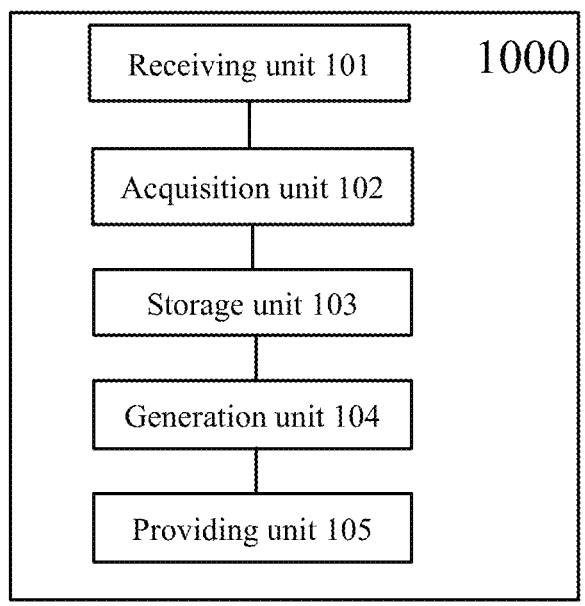
FIG. 10 illustrates a device 1000 for providing a two-dimensional code according to one embodiment of the present application.

FIG. 10 illustrates a device 1000 for providing a two-dimensional code according to one embodiment of the present application. The device includes:

a receiving unit 101 configured to receive a two-dimensional code generation request from a terminal of a first user, the request including service data corresponding to the two-dimensional code, the service data including a user identifier of the first user;

an acquisition unit 102 configured to acquire a first picture to correspond to the user identifier, the first picture being a picture identifiable by naked eyes;

a storage unit 103 configured to store an association relationship between the user identifier and the first picture;

a generation unit 104 configured to generate a two-dimensional code based on the service data; and a providing unit 105 configured to provide the two-dimensional code and the first picture to the first user.

Figure 11:
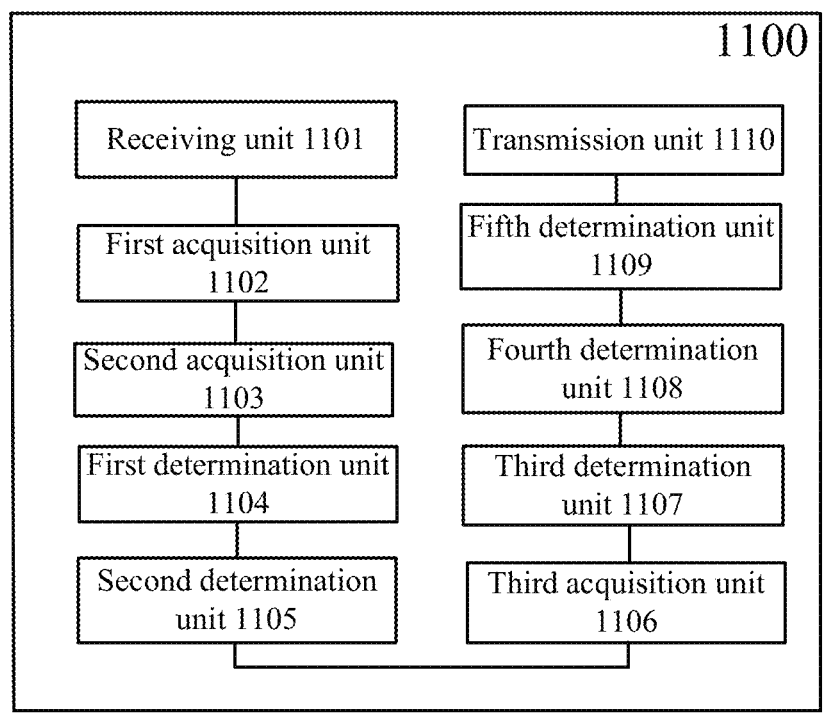
FIG. 11 illustrates a device 1100 for verifying a two-dimensional code according to one embodiment of the present application.

FIG. 11 illustrates a device 1100 for verifying a two-dimensional code according to one embodiment of the present application, including:

a receiving unit 1101 configured to receive two-dimensional code information and a first picture from a terminal of a second user;

a first acquisition unit 1102 configured to acquire content data of a two-dimensional code based on the two-dimensional code information;

a second acquisition unit 1103 configured to acquire service data and second picture information based on the content data of the two-dimensional code;

a first determination unit 1104 configured to determine a similarity between the first picture and the second picture based on information of the first picture and the second picture; and a second determination unit 1105 configured to determine that the verification does not pass if the similarity is lower than a predetermined threshold.

In one embodiment, second acquisition unit 1103 is further configured to acquire service data and a second picture by decrypting the content data of the two-dimensional code using a predetermined decryption method.

In one embodiment, receiving unit 1101 is further configured to receive a service code from the terminal of the second user, wherein the service code includes a two-dimensional code and the first picture which are superposed.

In one embodiment, the service data includes a user identifier of a third user, and the device further includes:

a third acquisition unit 1106 configured to acquire a third picture corresponding to the user identifier of the third user based on a pre-stored association relationship between user IDs and pictures in situations where the similarity between the first picture and the second picture is higher than a predetermined threshold;

a third determination unit 1107 configured to determine whether the first picture is consistent with the third picture; and a fourth determination unit 1108 configured to determine that the verification does not pass in situations where the first picture is not consistent with the third picture.

In one embodiment, the device further includes:

a fifth determination unit 1109 configured to determine that the verification passes in situations where the first picture is consistent with the third picture; and a transmission unit 1110 configured to transmit the service data to the terminal of the second user.

Figure 12:
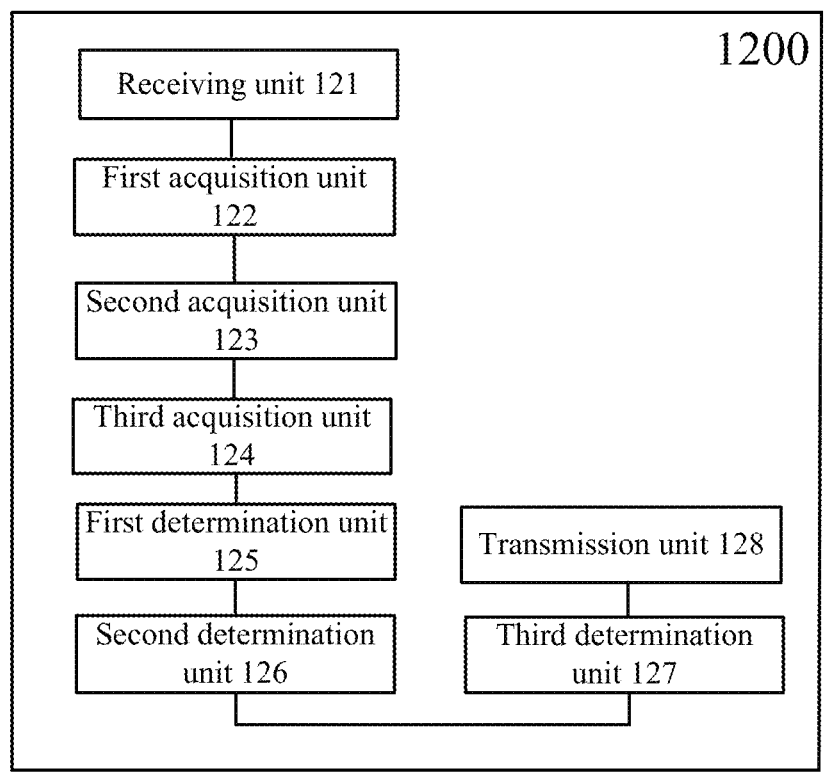
FIG. 12 illustrates a device 1200 for verifying a two-dimensional code according to one embodiment of the present application.

FIG. 12 illustrates a device 1200 for verifying a two-dimensional code according to one embodiment of the present application, including:

a receiving unit 121 configured to receive two-dimensional code information and a first picture from a terminal of a second user;

a first acquisition unit 122 configured to acquire content data of a two-dimensional code based on the two-dimensional code information;

a second acquisition unit 123 configured to acquire service data based on the content data of the two-dimensional code, the service data including a user identifier of a third user;

a third acquisition unit 124 configured to acquire a third picture corresponding to the user identifier of the third user based on a pre-stored association relationship between user IDs and pictures;

a first determination unit 125 configured to determine whether the first picture is consistent with the third picture; and a second determination unit 126 configured to determine that the verification does not pass in situations where the first picture is not consistent with the third picture.

In one embodiment, the device further includes:

a third determination unit 127 configured to determine that the verification passes in situations where the first picture is consistent with the third picture; and a transmission unit 128 configured to transmit the service data to the terminal of the second user.

Another aspect of the present application provides a computer apparatus, which includes a memory and a processor. It is characterized in that the memory stores executable codes, and the processor executes the executable codes to implement any one of the above methods.

Figure 13:
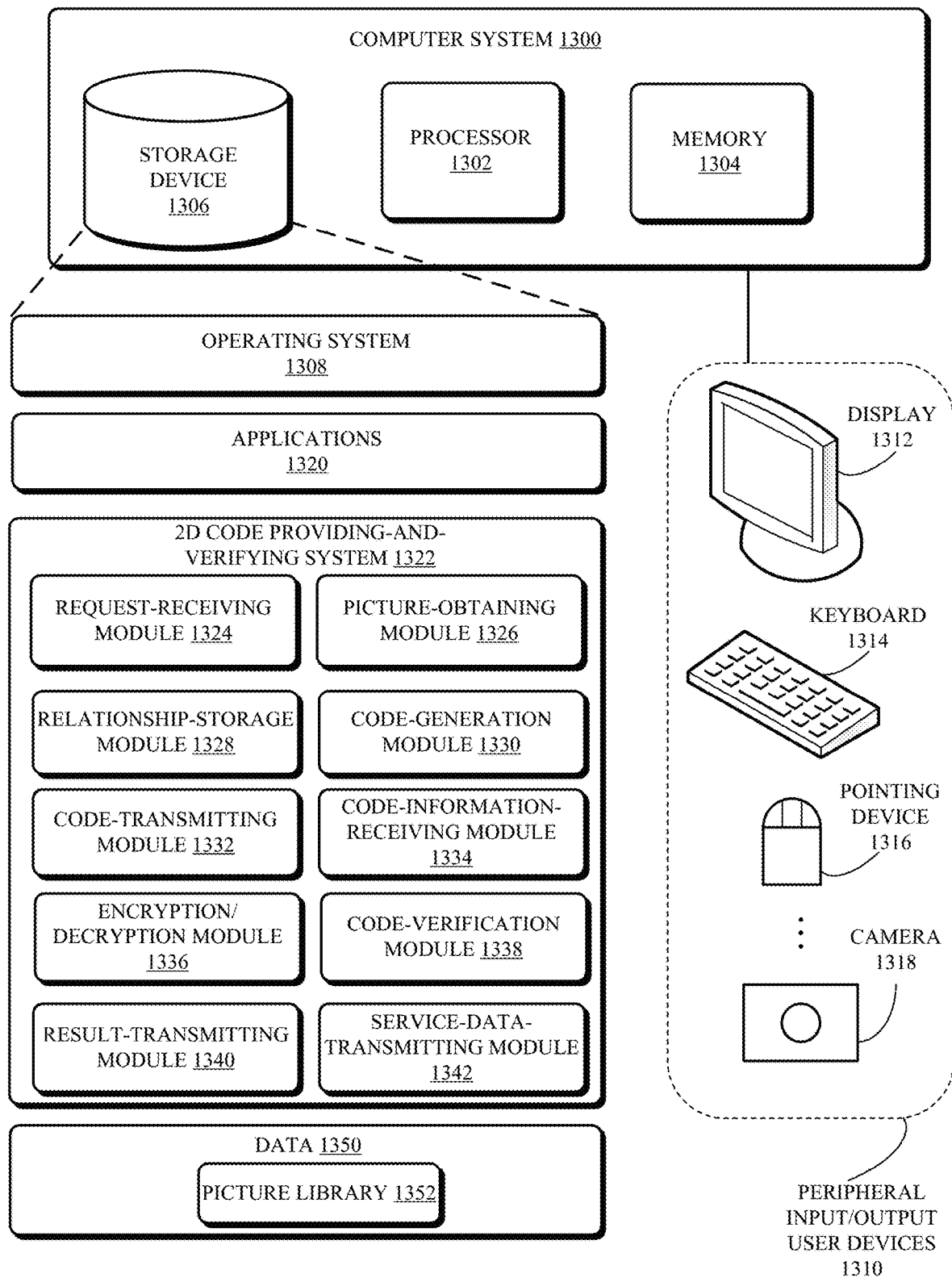
FIG. 13 illustrates an exemplary computer and communication system for providing and verifying a two-dimensional code, according to one embodiment.

FIG. 13 illustrates an exemplary computer and communication system for providing and verifying a two-dimensional code, according to one embodiment. In FIG. 13, computer system 1300 can include a processor 1302, a memory 1304, and a storage device 1306. Furthermore, computer system 1300 can be coupled to peripheral input/output (I/O) user devices 1310, e.g., a display device 1312, a keyboard 1314, a pointing device 1316, and a camera 1318. Storage device 1306 can store an operating system 1308, one or more applications 1320, a two-dimensional (2D) code providing-and-verifying system 1322, and data 1350.

Applications 1320 can include instructions, which can be loaded from storage device 1306 into memory 1304 and executed by processor 1302. As a result, computer system 1300 can perform specific functions provided by applications 1320.

2D code providing-and-verifying system 1322 can include instructions, which when executed by computer system 1300, can cause computer system 1300 or processor 1302 to perform methods and/or processes described in this disclosure. Specifically, 2D code providing-and-verifying system 1322 can include instructions for receiving a request for generating a two-dimensional code (request-receiving module 1324), instructions for obtaining a picture to be embedded in the two-dimensional code (picture-obtaining module 1326), instructions for storing the corresponding relationship between the picture and the user requesting the two-dimensional code (relationship-storage module 1328), instructions for generating the two-dimensional code based on the identifier of the user requesting the code and the picture (code-generation module module 1330), instructions for transmitting the generated two-dimensional code (code-transmitting module 1332), instructions for receiving two-dimensional code information from a user scanning a two-dimensional code (code-information-receiving module 1334), instructions for encrypting/decrypting content information included in the two-dimensional code (encryption/decryption module 1336), instructions for verifying the validity of the scanned two-dimensional code based on the received two-dimensional code information (code-verification module 1338), instructions for transmitting the verifications result (result-transmitting module 1340), and instructions for transmitting service data corresponding to the verified two-dimensional code to the user scanning the two-dimensional code (service-data-transmitting module 1342).

Data 1350 can include a picture library 1352.

In some embodiments, applications 1320 and the various modules in 2D code providing-and-verifying system 1322, such as modules 1324-1342 can be partially or entirely implemented in hardware and can be part of processor 1302. Further, in some embodiments, the system may not include a separate processor and memory. Instead, in addition to performing their specific tasks, modules 1320, and 1324-1342, either separately or in concert, may be part of general- or special-purpose computation engines.

Compared with the traditional two-dimensional code, the two-dimensional code solution according to embodiments of the present application adds a "verification picture," verifying that information carried and displayed in the verification picture and the main body of the two-dimensional code exhibit a basic unique corresponding relationship, information carried and displayed by the verification picture basically uniquely corresponds to the main part of the two-dimensional code, and the verification picture is obviously distinguishable, such that when the two-dimensional code is replaced as a whole (main body+verification picture), the user (such as a merchant or a consumer) can easily find out by naked eyes. When the main body of the two-dimensional code is replaced and the verification picture is retained, the whole process will be determined as that the verification does not pass by the server, and the process will be interrupted, thus avoiding the financial loss or other risks.

Each embodiment of the present application is described in a progressive manner, and the same or similar sections between various embodiments are described with reference to each other, each of which is focused on the differences with other embodiments. Especially, the system embodiment is described relatively briefly because it is substantially similar to the method embodiments, and for related parts, reference may be made to the method embodiments.

The foregoing describes specific embodiments of the present application. Other embodiments fall within the scope of the appended claims. In some cases, the actions or steps recorded in the claims may be performed in a different order than that therein, and the desired results can still be achieved. Further, the processes depicted in the drawings do not necessarily require the particular order or sequential order shown to achieve the desired result. In certain implementations, multitasking and parallel processing is or may be advantageous.

Those skilled in the art should further understand that the units and algorithm steps of each example described in combination with the embodiments disclosed herein may be implemented by means of electronic hardware, computer software or a combination of the two. In order to clearly describe the interchangeability between hardware and software, the components and steps of each example have been generally described in accordance with functions. Whether these functions are implemented by means of hardware or software depends on the specific application and design constraints of the technical solution. Those skilled in the art may use different methods to implement the described functions for each specific application, but such implementation shall not be considered beyond the scope of the present application.

The steps of the methods or algorithms described in combination with the embodiments disclosed herein may be implemented by means of hardware, a software module executed by a processor, or a combination of thereof. The software module may be placed in a Random Access Memory (RAM), an internal memory, a Read-Only Memory (ROM), an electrically programmable ROM, an electrically erasable programmable ROM, a register, a hard disk, a removable disk, a CD-ROM, or any other form of storage medium well known in the technical field.

The above-mentioned specific implementation modes further describe the purposes, technical solutions and beneficial effects of the present application. It should be understood that what are described above are only the specific implementation modes of the present application, and are not used to limit the scope of protection of the present application. Any modification, equivalent replacement, improvement and the like made within the spirit and principle of the present application shall be included within the scope of protection of the present application.

What is claimed is:

1. A computer-executed method, comprising:
   receiving, by a computer from a terminal of a first user, a two-dimensional code generation request comprising service data, which comprises at least an identifier of the first user;
   obtaining a human-recognizable picture;
   associating the obtained picture with the identifier of the first user and storing the association between the obtained picture and the identifier of the first user;
   encrypting a combination of the service data and the obtained picture to obtain encrypted data;
   generating a two-dimensional code based on the encrypted data; and
   providing the two-dimensional code and the obtained picture to the first user, thereby facilitating the first user to display the two-dimensional code and the obtained picture when providing services.

2. The method according to claim 1, wherein providing the two-dimensional code and the obtained picture to the first user comprises:
   generating a service code by superposing the obtained picture and the two-dimensional code; and
   providing the service code to the first user.

3. The method according to claim 2, wherein the obtained picture is a picture readable by a two-dimensional code identification apparatus.

4. The method according to claim 2, wherein the obtained picture is located inside the two-dimensional code.

5. The method according to claim 4, wherein an area occupied by the obtained picture in the two-dimensional code is determined based on an error correction level of the two-dimensional code.

6. The method according to claim 1, wherein the obtained picture comprises one or more of: a pattern, a character, a number, and a symbol.

7. The method according to claim 1, wherein a possibility of the obtained picture being associated with an identifier of a different user is lower than a predetermined value.

8. The method according to claim 7, wherein the obtained picture belongs to a picture library comprising a number of pictures greater than a predetermined value.

9. The method according to claim 1, further comprising:
   receiving, from a terminal of a second user, two-dimensional code information and a picture, wherein the two-dimensional code information and the picture are obtained by the terminal of the second user scanning a service code;
   determining a user identifier and a picture based on the received two-dimensional code information;
   comparing the determined picture and the received picture; and
   outputting a verification result of the service code based on an outcome of the comparison.

10. The method according to claim 9, wherein comparing the determined picture and the received picture comprises determining a similarity between the determined picture and the received picture, and wherein outputting the verification result comprises:
    in response to the similarity being lower than a predetermined threshold, outputting a result indicating that the verification fails.

11. The method according to claim 10, wherein outputting the verification result further comprises:
    in response to the similarity being greater than a predetermined threshold, identifying, based on previously stored associations between user identifiers and pictures, a picture corresponding to the determined user identifier;
    in response to the identified picture does not match the received picture, outputting a result indicating that the verification fails.

12. The method according to claim 11, further comprising:
    in response to the identified picture matches the received picture, transmitting service data associated with the determined user identifier to the second user.

13. The method according to claim 9, wherein determining the user identifier and the picture comprises decrypting content data associated with the two-dimensional code information.

14. The method according to claim 9, wherein determining the picture comprises identifying, based on previously stored associations between user identifiers and pictures, a picture corresponding to the determined user identifier, and wherein comparing the determined picture and the received picture comprises determining whether the identified picture matches the received picture.

15. A computer system, comprising:
 a processer;
 a storage device coupled to the processor and storing instructions, which when executed by the processor cause the processor to perform a method, the method comprising:
  receiving, by a computer from a terminal of a first user, a two-dimensional code generation request comprising service data, which comprises at least an identifier of the first user;
  obtaining a human-recognizable picture;
  associating the obtained picture with the identifier of the first user and storing the association between the obtained picture and the identifier of the first user;
  encrypting a combination of the service data and the obtained picture to obtain encrypted data;
  generating a two-dimensional code based on the encrypted; and
  providing the two-dimensional code and the obtained picture to the first user, thereby facilitating the first user to display the two-dimensional code and the obtained picture when providing services.

16. The computer system according to claim 15, wherein providing the two-dimensional code and the obtained picture to the first user comprises:
 generating a service code by superposing the obtained picture and the two-dimensional code; and
 providing the service code to the first user.

17. The computer system according to claim 16, wherein the obtained picture is a picture readable by a two-dimensional code identification apparatus.

18. The computer system according to claim 16, wherein the obtained picture is located inside the two-dimensional code.

19. The computer system according to claim 18, wherein an area occupied by the obtained picture in the two-dimensional code is determined based on an error correction level of the two-dimensional code.

20. The computer system according to claim 1, wherein the obtained picture comprises one or more of: a pattern, a character, a number, and a symbol.

21. The computer system according to claim 1, wherein a possibility of the obtained picture being associated with an identifier of a different user is lower than a predetermined value.

22. The computer system according to claim 21, wherein the obtained picture belongs to a picture library comprising a number of pictures greater than a predetermined value.

23. The computer system according to claim 15, wherein the method further comprises:
 receiving, from a terminal of a second user, two-dimensional code information and a picture, wherein the two-dimensional code information and the picture are obtained by the terminal of the second user scanning a service code;
 determining a user identifier and a picture based on the received two-dimensional code information;
 comparing the determined picture and the received picture; and
 outputting a verification result of the service code based on an outcome of the comparison.

24. The computer system according to claim 23, wherein comparing the determined picture and the received picture comprises determining a similarity between the determined picture and the received picture, and wherein outputting the verification result comprises:
 in response to the similarity being lower than a predetermined threshold, outputting a result indicating that the verification fails.

25. The computer system according to claim 24, wherein outputting the verification result further comprises:
 in response to the similarity being greater than a predetermined threshold, identifying, based on previously stored associations between user identifiers and pictures, a picture corresponding to the determined user identifier;
 in response to the identified picture does not match the received picture, outputting a result indicating that the verification fails.

26. The computer system according to claim 25, wherein the method further comprises:
 in response to the identified picture matches the received picture, transmitting service data associated with the determined user identifier to the second user.

27. The computer system according to claim 23, wherein determining the user identifier and the picture comprises decrypting content data associated with the two-dimensional code information.

28. The computer system according to claim 23, wherein determining the picture comprises identifying, based on previously stored associations between user identifiers and pictures, a picture corresponding to the determined user identifier, and wherein comparing the determined picture and the received picture comprises determining whether the identified picture matches the received picture.

* * * * *

UNITED STATES PATENT AND TRADEMARK OFFICE
CERTIFICATE OF CORRECTION

| | |
|---|---|
| PATENT NO. | : 11,216,627 B2 |
| APPLICATION NO. | : 17/162947 |
| DATED | : January 4, 2022 |
| INVENTOR(S) | : Liu |

It is certified that error appears in the above-identified patent and that said Letters Patent is hereby corrected as shown below:

In the Claims

Claim 20, Column 25, Line 44 "The computer system according to claim 1" should read "The computer system according to claim 15"

Claim 21, Column 25, Line 48 "The computer system according to claim 1" should read "The computer system according to claim 15"

Signed and Sealed this
Tenth Day of May, 2022

Katherine Kelly Vidal
*Director of the United States Patent and Trademark Office*